Feb. 5, 1935. J. L. HOPE 1,989,984
MAGNETIC COUPLING
Filed Dec. 18, 1931  3 Sheets-Sheet 1
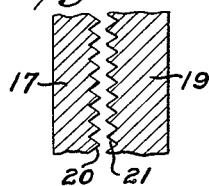
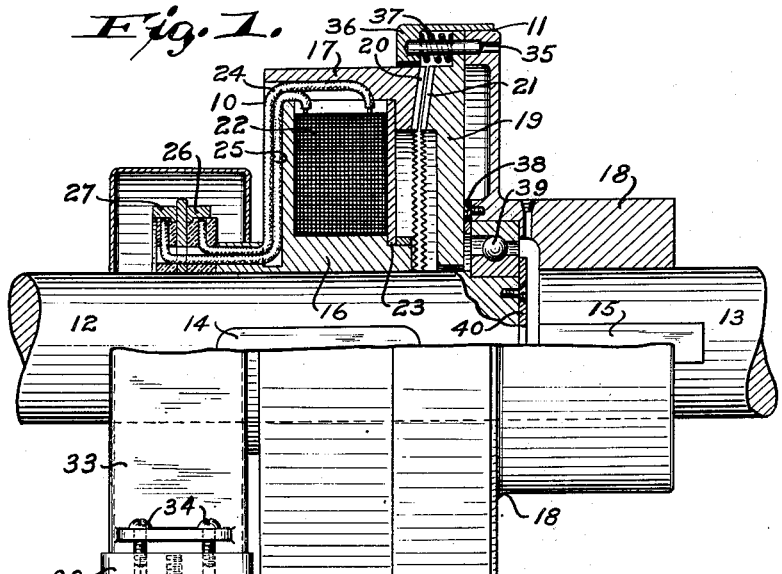
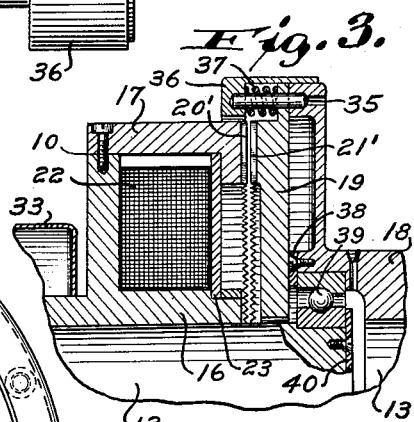
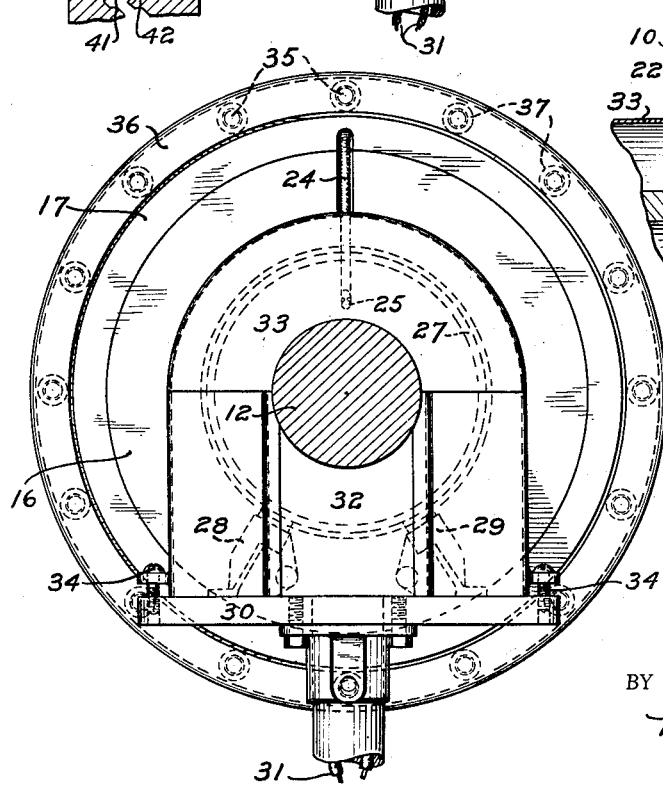
INVENTOR.
J. L. Hope
BY
Morsell & Morsell
ATTORNEYS.

Feb. 5, 1935.  J. L. HOPE  1,989,984
MAGNETIC COUPLING
Filed Dec. 18, 1931  3 Sheets-Sheet 2
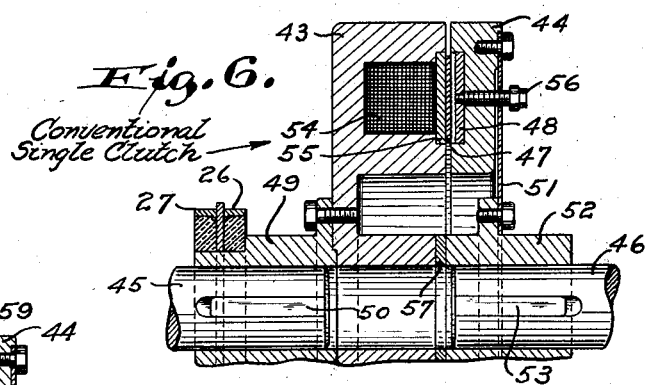
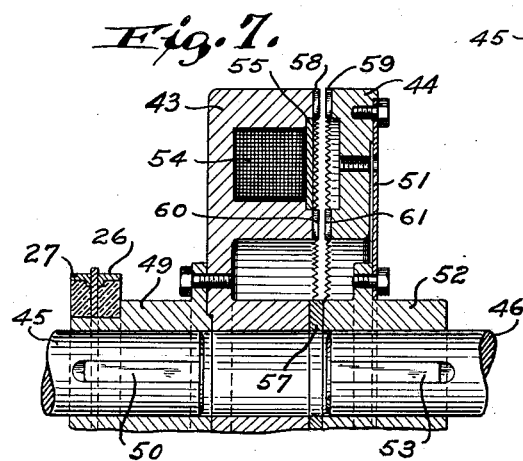
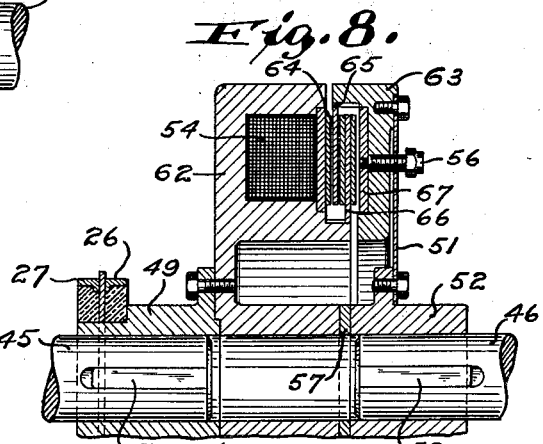
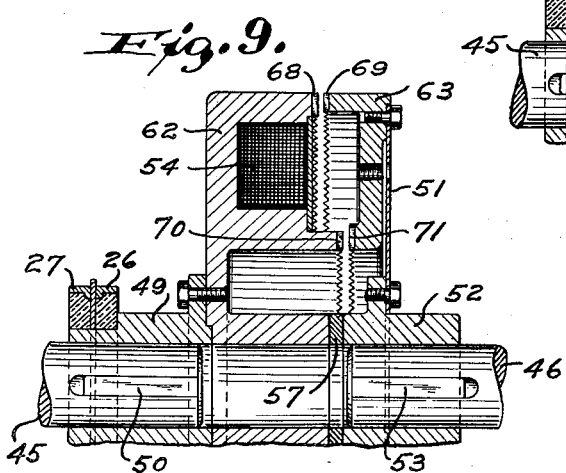
INVENTOR.
BY *J. L. Hope*
*Morsell & Morsell*
ATTORNEYS.

Feb. 5, 1935.  J. L. HOPE  1,989,984
MAGNETIC COUPLING
Filed Dec. 18, 1931   3 Sheets-Sheet 3
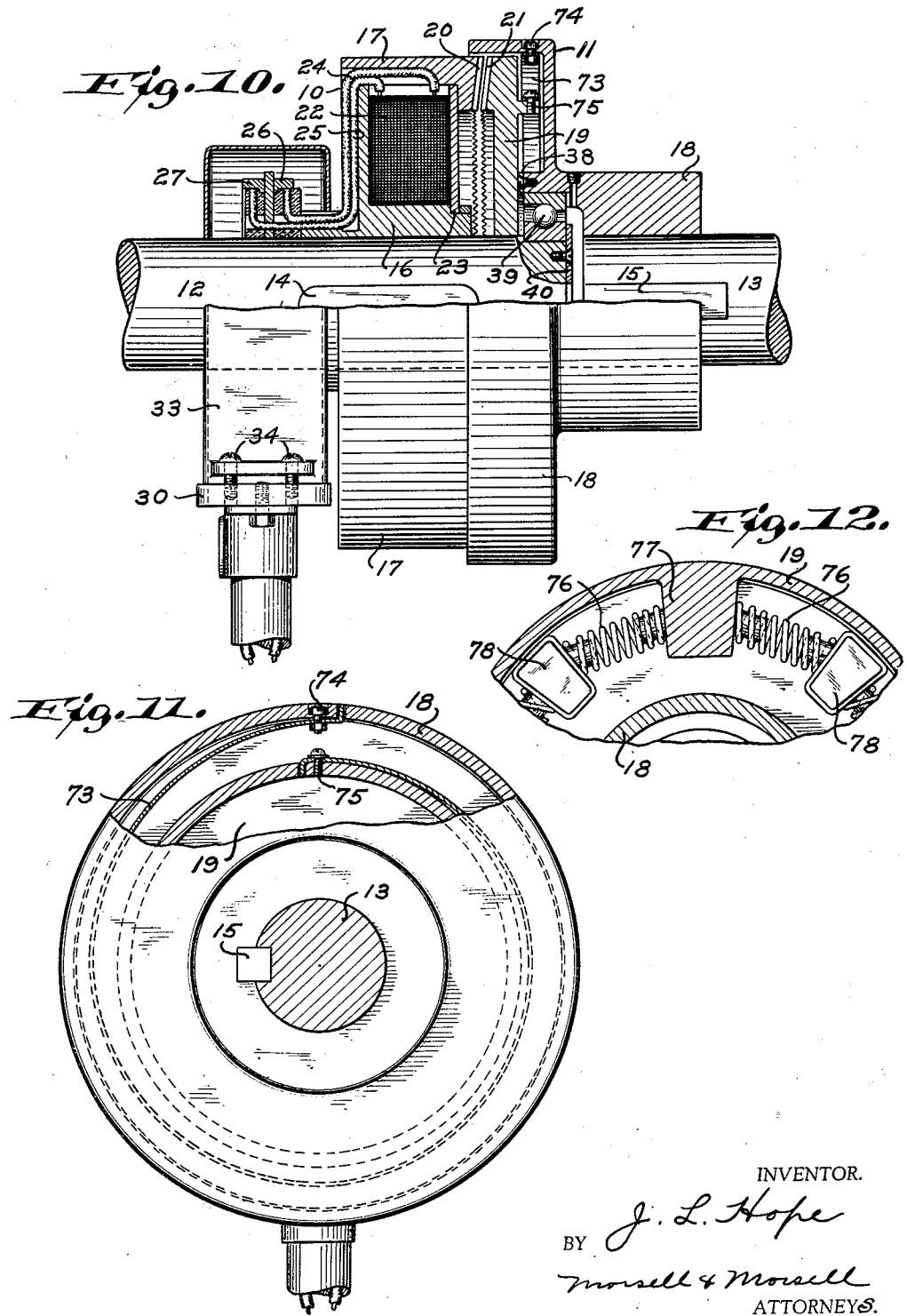

Patented Feb. 5, 1935

1,989,984

UNITED STATES PATENT OFFICE 1,989,984

MAGNETIC COUPLING

James L. Hope, Milwaukee, Wis., assignor to Dings Magnetic Separator Co., Milwaukee, Wis., a corporation of Wisconsin Application December 18, 1931, Serial No. 581,840

5 Claims. (Cl. 192—84)

The present invention relates in general to improvements in the construction and operation of mechanisms for connecting and disconnecting adjoining rotary elements, and relates more specifically to an improved electrically controlled coupling for uniting the adjacent ends of substantially coaxial rotary shafts or the like.

An object of the invention is to provide an improved coupling which is simple in construction, and which is moreover efficient in operation.

It has heretofore been common practice to utilize so-called magnetic friction clutches for transmitting rotary motion from one shaft to another, the connection and disconnection of which was controllable from a point remote from the coupling itself. While the operation of these prior friction clutches could be conveniently effected, they were capable of producing only a frictional connection between the interconnected elements, and did not eliminate undesirable slippage in cases where positive or substantially positive motion transmission was required. It frequently occurs that positive or semi-positive driving is essential to the successful utilization of such couplings, and that it is also desirable to provide for any degree of angular displacement between the interconnected elements and with respect to the common axis of rotation thereof, but the prior magnetic friction clutches did not meet these special conditions and did not provide for positive interconnection between the elements without possible slippage.

A more specific object of the present invention is to provide an improved magnetic coupling which produces a substantially positive interlock between the interconnected elements.

Another object of the invention is to provide an improved magnetic clutch of the positive grip type wherein it is possible to obtain any desired degree of angular advancement of one of the coupled elements with respect to the other, about their common axis of rotation.

A further specific object of the invention is to provide a remote controlled electrically actuated positive coupling, which while eliminating undesirable slippage between the interconnected elements, will permit coupling thereof at various angular positions with respect to the common axis of rotation, by relatively small increments of angular displacement.

Still another object of the invention is to provide a positive magnetic clutch which will automatically disconnect the normally connected members, under abnormal conditions of operation, without danger of damaging the clutch mechanism.

Another object of the invention is to provide for convenient conversion of a friction coupling into a positive clutch mechanism, and vice versa.

A further object of the invention is to provide an improved magnetic coupling which can be manufactured at minimum cost and which may be operated with minimum effort from a station located at some distance from the coupling.

Still another specific object of the invention is to provide a clutch having improved means for causing gradual connection of the elements without shock.

These and other objects and advantages will be apparent from the following detailed description.

A clear conception of several embodiments of the invention and of the mode of constructing and operating magnetic clutches built in accordance therewith, may be had by referring to the drawings accompanying and forming a part of this specification, in which like reference characters designate the same or similar parts in the various views:

Fig. 1 is a part sectional side elevation of one form of improved magnetic clutch having interlocking motion transmitting teeth disposed at an oblique angle with respect to the common axis of rotation of the adjoining shafts;

Fig. 2 is an end view of the magnetic clutch specifically shown in Fig. 1;

Fig. 3 is a fragmentary section through another form of the improved magnetic clutch, wherein the interlocking teeth are disposed at a right angle relative to the shaft axis;

Fig. 4 is a fragment of a development of one type of interlocking teeth such as may be utilized to advantage in the improved magnetic coupling;

Fig. 5 is a similar fragment of a development of another type of interlockable teeth for the improved magnetic coupling;

Fig. 6 is a sectional view of a fragment of an ordinary magnetic friction clutch of simple design;

Fig. 7 is a similar section through the clutch of Fig. 6, showing the same converted into a positive magnetic clutch embodying the present invention;

Fig. 8 is a sectional view of a fragment of a multidisk magnetic friction clutch of ordinary design;

Fig. 9 is a similar section through the clutch of Fig. 8, showing the same converted into a positive magnetic clutch embodying the present invention;

Fig. 10 is a part sectional elevation of a clutch provided with one form of shock absorber;

Fig. 11 is a part sectional end view of the clutch of Fig. 10; and

Fig. 12 is a fragmentary sectional view of a modified shock absorber.

In the improved magnetic coupling specifically illustrated in Figs. 1 and 2, the adjoining rotary members 10, 11 are secured to coaxial shafts 12, 13 respectively, by means of keys 14, 15 or the like. The member 10 comprises an inner element 16 and an outer ring element 17, and the adjoining member 11 comprises an outer element 18 and an inner disc element 19. The ring element 17 and the disc element 19 have adjoining annular portions provided with interengageable radial serrations or teeth 20, 21 disposed at an oblique angle relative to the common axis of the shafts 12, 13.

The elements 16, 17 which form the member 10, provide a housing for an electromagnetic coil 22 which is held in place by means of a plate 23 and a lock ring, and which has terminals 24, 25 connected to contact rings 26, 27 respectively. The contact rings 26, 27 are insulated from each other and are rotatable with the member 10 and shaft 12. Brushes 28, 29 coacting with the rings 26, 27 are supported upon a stationary base 30, and conductors 31 extend from the brushes 28, 29 to a remotely disposed control station wherein is located the push button or other switch for controlling the energization or de-energization of the magnet coil 22. The fixed base 30 is provided with a wall 32 disposed beneath the shaft 12, and a removable cover cooperates with the wall 32 and base 30 to provide an enclosure for the brushes 28, 29 and rings 26, 27. The cover 33 may be removed to permit free access to the brushes and contact rings, upon removal of the retainer screws 34.

The elements 18, 19 which form the member 11, are drivingly interconnected by means of an annular series of parallel pins 35 secured to the element 18 and slidably penetrating the periphery of the disc element 19. The pins 35 are held in place and are maintained parallel to each other by means of a retainer ring 36 rigidly but removably attached to the periphery of the element 18 and surrounding the pins 35 and the disc element 19. Coil springs 37 embrace the pins 35 and react against the ring 36 and also against the element 19, and these springs at all times tend to urge the disc element 19 away from the adjacent ring element 17 and toward the element 18. A stop plate 38 carried by the element 18 is adapted to coact with the disc element 19 near the axis of rotation, and a ball bearing 39 disposed between the element 18 and the adjacent end of the shaft 12, serves to stabilize these parts and to maintain the elements 10, 11 in true alignment with the common axis of rotation. The ball bearing 39 is retained in position by means of the stop plate 38, and also by a removable plate 40 secured to the end of the shaft 12.

The improved magnetic coupling specifically shown in Fig. 3 is similar to that disclosed in Figs. 1 and 2. In the modified coupling of Fig. 3 the serrations or teeth 20', 21' formed on the ring element 17 and on the disc element 19 respectively, are disposed at a right angle with respect to the axis of rotation of the shafts 12, 13. While this disposition of the teeth 20', 21' is satisfactory under certain conditions of operation, the formation and disposition of the teeth 20, 21 as shown in Fig. 1, has the advantage that the inclination and convergence of the teeth toward a common apex will have a greater tendency to centralize the shafts 12, 13 in a manner similar to a cone entering a conical recess.

As illustrated in Fig. 5, the interlocking projections or teeth 41, 42 may be of modified construction. These modified teeth are provided with coacting surfaces lying in radial planes, and these coacting surfaces will positively prevent the interlock from being broken. With the serrations 20, 21 formed as illustrated in Fig. 4, the interlock may be broken or destroyed when excessive torque is applied, but with the teeth 41, 42 formed as shown in Fig. 5, the teeth will be broken off rather than permitting separation of the rotary members due to the application of excessive torque It will therefore be apparent that the teeth 20, 21 of Fig. 4 introduce a safety release feature which may be desirable under certain conditions, and that the teeth 41, 42 of Fig. 5 positively prevent breaking of the interlock due to unusual torque conditions.

The single magnetic friction clutch shown in Fig. 6 is of ordinary construction comprising adjoining rotary members 43, 44 mounted respectively upon concentric shafts 45, 46, and carrying cooperable friction disks 47, 48. The member 43 is attached directly to a hub 49 which is in turn secured to the shaft 45 by means of a key 50, while the member 44 is attached to a spring disk 51 which is attached to a hub 52 secured to the shaft 46 by a key 53. An electro-magnetic coil 54 is housed within the member 43 and is adapted to be energized and de-energized through contact rings 26, 27 and electrical conductors as previously described, and the spring disk 51 permits restrained movement of the member 44 toward the member 43. The friction disk 47 is detachably associated with a retainer plate 55 which confines the coil 54 within the member 43, and the opposed friction disk 48 is held in place relative to the member 44, by means of adjusting screws 56. The shafts 45, 46 are prevented from moving axially by means of an insert or bearing plate 57.

In order to convert the single magnetic friction clutch of Fig. 6 into a positive magnetic coupling of the improved type, such as illustrated in Fig. 7, it is only necessary to remove the friction disks 47, 48 and to provide serrations or teeth 58, 59, 60, 61, directly on the adjacent faces of the members 43, 44. The teeth 58, 59, 60, 61 may be cut into the members 43, 44 and do not interfere with the re-conversion of the coupling into a friction clutch, at any time.

The multiple disk friction clutch shown in Fig. 8 is likewise of ordinary construction and comprises adjoining rotary members 62, 63 mounted respectively upon concentric shafts 45, 46 and carrying cooperable friction disks 64, 65, 66, 67. The member 62 is attached directly to a hub 49 which is secured to the shaft 45 by means of a key 50, while the member 63 is attached to a spring disk 51 which is attached to a hub 52 secured to the shaft 46 by a key 53. An electro-magnetic coil 54 is likewise housed within the member 62 and is adapted to be energized and de-energized through contact rings 26, 27 and electrical conductors as in the devices previously described, and the spring disk 51 permits restrained movement of the member 63 toward the member 62. The friction disks 64, 66 are detachably associated with the member 62, while the friction disks 65, 67 are similarly associated with the movable member 63.

The shafts 45, 46 are prevented from moving axially by means of an annular insert or bearing plate 57 and the structure is otherwise similar to the single magnetic clutch previously described.

In order to convert the multiple disk magnetic friction clutch shown in Fig. 8, into a positive grip magnetic coupling, such as shown in Fig. 9, it is only necessary to remove the friction disks 64, 65, 66, 67, and to provide interlockable serrations or teeth 68, 69, 70, 71 directly on the adjacent faces of the members 62, 63. The teeth 68, 69 are cut into the outer adjoining portions of the members 62, 63 while the teeth 70, 71 are similarly cut upon the inner adjacent portions thereof. These teeth 68, 69, 70, 71, are preferably so formed that they do not interfere with reconversion of the coupling structure into a friction clutch of the type shown in Fig. 8, at any time.

The clutch of Figs. 10 and 11 is similar in general construction to that disclosed in Figs. 1 and 2, but is provided with an improved shock absorber. This absorber comprises a spiral flat spring 73 the outer end of which is permanently attached to the peripheral flange of the element 18 by means of a screw 74, and the inner end of which is likewise attached to an annular projection on the element 19 by means of a screw 75. The pins 35 and springs 37 are omitted from the clutch of Figs. 10 and 11, since the spiral spring 73 while permitting relative angular displacement of the elements 18, 19 about the axis of the shaft 13, also tends to pull these elements toward each other and therefore draws the element 19 away from the element 17 when the coil 22 is deenergized. Although only one spring 73 has been illustrated, any desired number of these springs may be utilized, and any other type of fastening may be utilized, in place of the screws 74, 75.

The clutch of Fig. 12 is also generally similar to that of Figs. 1 and 2, but is provided with a modified type of shock absorber comprising a series of coil springs 76 coacting with lateral abutments 77, 78 formed on the elements 19, 18 respectively. The springs 76 also permit the elements 18, 19 to move angularly about the shaft 13 and relatively to each other, but tend to pull the elements 18, 19 toward each other at all times.

The mode of operation of all of the couplings illustrated, is identical, and it will therefore suffice to describe the operation of the device shown in Figs. 1 and 2. The elements 17, 19 are normally spaced apart as shown in Fig. 1, and the springs 37 function to maintain the element 19 in contact with the element 18. When the coil 22 is energized, the electromagnetic forces produced, pull the disk element 19 in opposition to the springs 37, and quickly cause the teeth 20, 21 to interlock and thus produce rotation of the shafts 12, 13 at the same speed. When the coil 22 is deenergized, the springs 37 immediately become effective to disengage the teeth 20, 21, thereby interrupting the driving connection.

If the interlocking teeth 20, 21 are formed as shown in Fig. 4, excessive torque stresses will cause the teeth to automatically disengage and thus destroy the driving connection. If the interlocking teeth 41, 42 are formed as shown in Fig. 5, no separation thereof will result from excessive torque stresses. By providing a multiplicity of interlocking teeth, the relative angular displacement between the members about the axis of rotation is reduced to small increments, and the teeth may be readily formed with an ordinary milling machine.

The interchangeable clutches shown in Figs. 6 to 9 inclusive, not only permit the user to convert a coupling from a friction to a jaw clutch and vice versa, but also enable the manufacturer to materially reduce the costs of construction. The existence of the interlocking teeth on the cooperating rotary members of these clutches, do not prevent their utilization in the assemblage of ordinary friction clutches such as shown in Figs. 6 and 8.

The shock absorbing springs 73, 76 of the clutches shown in Figs. 10 to 12, inclusive, serve to protect the teeth 20, 21 against violent impact and permit inter-locking of the elements 17, 19 gradually and without danger of breaking the teeth off. These springs 73, 76 also function to permit slight angular displacement within the limits of action of the springs, between the shafts 12, 13 during normal driving through the clutch. The springs additionally serve to reduce the power consumption at starting, by gradually absorbing the starting torque between the rotating driving member and the driven member.

From the foregoing description it will be apparent that the invention provides a simple and highly effective positive grip magnetic clutch which can be manufactured at but slight additional cost above that of the ordinary magnetic friction clutch. The improved clutch is especially adapted to be used where slight angular displacement of the coacting rotary members is desirable, and has proven highly successful in commercial operation.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. In combination, a pair of coupling members rotatable about an axis, one of said members being movable along and the other being fixed with respect to said axis and said members having opposed annular series of inter-engageable V-shaped teeth radiating from said axis, an electromagnetic coil carried by said fixed member and operable to slide said movable member along said axis to effect inter-engagement of said teeth, and resilient means coacting with said movable member closely adjacent to said teeth for quickly releasing the latter when said coil is deenergized.

2. In combination, a pair of coupling members rotatable about an axis, one of said members being movable along and the other being fixed with respect to said axis and said members having opposed annular series of inter-engageable V-shaped teeth radiating from but disposed at oblique angles relative to said axis, an electromagnetic coil carried by said fixed member and operable to slide said movable member along said axis to effect inter-engagement of said teeth, and resilient means coacting with said movable member closely adjacent to said teeth for quickly releasing the latter when said coil is deenergized.

3. In combination, a pair of coupling members rotatable about an axis, one of said members being movable along and the other being fixed with respect to said axis and said members having opposed annular series of inter-engageable V-shaped teeth radiating from but disposed at oblique angles relative to said axis, an electromagnetic coil carried by one of said members and operable to slide said other member along said axis to effect inter-engagement of said teeth, and resilient means coacting with said other member closely adacent to said teeth for quickly releasing the latter when said coil is deenergized.

4. In combination, a pair of coupling members rotatable about an axis, one of said members being movable along and the other being fixed with respect to said axis and said members having opposed annular series of inter-engageable V-shaped teeth radiating from said axis, an electromagnetic coil carried by said fixed member and operable to slide said movable member along said axis to effect inter-engagement of said teeth, and spring means coacting with said movable member peripherally beyond and closely adjacent to said teeth for quickly and positively releasing the latter when said coil is deenergized.

5. In combination, a pair of coupling members rotatable about an axis, one of said members being movable along and the other being fixed with respect to said axis and said members having opposed annular series of inter-engageable V-shaped teeth radiating from but disposed at oblique angles relative to said axis, an electromagnetic coil carried by said fixed member and operable to slide said movable member along said axis to effect inter-engagement of said teeth, and spring means coacting with said movable member peripherally beyond and closely adjacent to said teeth for quickly and positively releasing the latter when said coil is deenergized.

JAMES L. HOPE.